(12) United States Patent
Zheng et al.

(10) Patent No.: US 10,229,193 B2
(45) Date of Patent: Mar. 12, 2019

(54) COLLECTING EVENT RELATED TWEETS

(71) Applicant: SAP SE, Walldorf (DE)

(72) Inventors: Xin Zheng, Singapore (SG); Aixin Sun, Singapore (SG)

(73) Assignee: SAP SE, Walldorf (DE)

( * ) Notice: Subject to any disclaimer, the term of this patent is extended or adjusted under 35 U.S.C. 154(b) by 212 days.

(21) Appl. No.: 15/284,509

(22) Filed: Oct. 3, 2016

(65) Prior Publication Data
US 2018/0096057 A1 Apr. 5, 2018

(51) Int. Cl.
  *G06F 17/30* (2006.01)
  *G06N 99/00* (2019.01)
  *H04L 12/58* (2006.01)

(52) U.S. Cl.
  CPC ..... *G06F 17/30705* (2013.01); *G06N 99/005* (2013.01); *H04L 51/16* (2013.01); *H04L 51/32* (2013.01)

(58) Field of Classification Search
  CPC ................. G06F 17/30705; G06F 17/30699
  See application file for complete search history.

(56) References Cited

U.S. PATENT DOCUMENTS

| | | | | |
|---|---|---|---|---|
| 9,729,942 B2* | 8/2017 | Vehovsky | ............ | H04N 9/8205 |
| 9,892,168 B1* | 2/2018 | Apreleva | ............ | G06F 17/3053 |
| 2001/0042204 A1* | 11/2001 | Blaker | ............ | G06F 17/30949 |
| | | | | 713/165 |
| 2008/0256052 A1* | 10/2008 | Kar | ............ | G06F 17/30693 |
| 2008/0281857 A1* | 11/2008 | Dymetman | ....... | G06F 17/30911 |
| 2009/0048927 A1* | 2/2009 | Gross | ................ | G06F 17/30867 |
| | | | | 705/14.42 |
| 2009/0124241 A1* | 5/2009 | Krishnaswamy | ...... | G06Q 30/02 |
| | | | | 455/414.2 |
| 2010/0145678 A1* | 6/2010 | Csomai | ................ | G06F 17/241 |
| | | | | 704/9 |
| 2011/0106807 A1* | 5/2011 | Srihari | ............. | G06F 17/30604 |
| | | | | 707/739 |
| 2011/0131207 A1* | 6/2011 | Jonsson | ............... | G06Q 10/107 |
| | | | | 707/730 |
| 2011/0184806 A1* | 7/2011 | Chen | .................... | G06K 9/6226 |
| | | | | 705/14.52 |
| 2013/0212109 A1* | 8/2013 | Evancich | ............... | G06Q 50/22 |
| | | | | 707/740 |

(Continued)

OTHER PUBLICATIONS

S. Kullback et al., "On Information and Sufficiency", The Annals of Mathematical Statistics, Mar. 1951, pp. 79-86, vol. 22, No. 1, Institute of Mathematical Statistics.

(Continued)

*Primary Examiner* — Hosain T Alam
*Assistant Examiner* — Anthony G Gemignani
(74) *Attorney, Agent, or Firm* — Jones Day

(57) ABSTRACT

Described herein is a framework for collecting event related tweets. In accordance with one aspect of the framework, an initial set of keywords is constructed from a reference source. Tweets are collected from a messaging stream using the initial set of keywords for a first time window. The collected tweets are filtered to generate a candidate keywords set. The selected tweets of the candidate keywords set are grouped into a plurality of clusters. The clusters are classified into event related and non-event related clusters. The initial set of keywords is updated to obtain a new set of keywords.

16 Claims, 5 Drawing Sheets

(56) References Cited

U.S. PATENT DOCUMENTS

| | | | |
|---|---|---|---|
| 2014/0133766 A1* | 5/2014 | Das | H04N 5/2251 382/224 |
| 2014/0164297 A1* | 6/2014 | Deolalikar | G06N 99/005 706/12 |
| 2014/0279738 A1* | 9/2014 | Mahler | G06N 99/005 706/12 |
| 2016/0055490 A1* | 2/2016 | Keren | G06Q 30/00 705/14.47 |
| 2016/0212200 A1* | 7/2016 | Alonso | G06Q 10/109 |
| 2016/0378858 A1* | 12/2016 | Vadrevu | G06F 17/30696 707/737 |
| 2017/0034107 A1* | 2/2017 | Krishnaswamy | H04L 51/32 |
| 2017/0140038 A1* | 5/2017 | Zheng | G06F 17/30864 |
| 2017/0249557 A1* | 8/2017 | Tendick | G06N 5/043 |
| 2017/0315984 A1* | 11/2017 | Goyal | G06F 17/277 |
| 2017/0322923 A1* | 11/2017 | Dixon | G06F 17/274 |
| 2018/0025069 A1* | 1/2018 | Kataria | G06F 17/30598 707/740 |
| 2018/0039691 A1* | 2/2018 | Hazra | G06Q 50/01 |
| 2018/0074868 A1* | 3/2018 | Standley | G06F 9/4843 |

OTHER PUBLICATIONS

Hieu T. Nguyen et al., "Active Learning Using Pre-Clustering", ICML '04 Proceedings of the Twenty-first International Conference on Machine Learning, Jul. 4-8, 2004, pp. 79, ACM, Banff, Alberta, Canada.

Simon Tong et al., "Support Vector Machine Active Learning with Applications to Text Classification", The Journal of Machine Learning Research, Nov. 2001, pp. 45-66, vol. 2, JMLR.

Takeshi Sakaki et al., "Earthquake Shakes Twitter Users: Real-time Event Detection by Social Sensors", WWW '10 Proceedings of the 19th International Conference on World Wide Web, Apr. 26-30, 2010, pp. 851-860, ACM, Raleigh, North Carolina, USA.

Yan Chen et al., "Emerging Topic Detection for Organizations from Microblogs", SIGIR '13 Proceedings of the 36th International ACM SIGIR Conference on Research and Development in Information Retrieval, Jul. 28-Aug. 1, 2013, pp. 43-52, ACM, Dublin, Ireland.

Zongyang Ma et al., "Tagging Your Tweets: A Probabilistic Modeling of Hashtag Annotation in Twitter", CIKM '14 Proceedings of the 23rd ACM International Conference on Conference on Information and Knowledge Management, Nov. 3-7, 2014, pp. 999-1008, ACM, Shanghai, China.

Alexandra Olteanu et al., "What to Expect When the Unexpected Happens: Social Media Communications Across Crises", CSCW '15 Proceedings of the 18th ACM Conference on Computer Supported Cooperative Work & Social Computing, Mar. 14-18, 2015, pp. 994-1009, ACM, Vancouver, BC, Canada.

Surendra Sedhai et al., "HSpam14: A Collection of 14 Million Tweets for Hashtag-Oriented Spam Research", SIGIR '15 Proceedings of the 38th International ACM SIGIR Conference on Research and Development in Information, Aug. 9-13, 2015, pp. 223-232, ACM, Santiago, Chile.

James D. Hamilton, "Time Series Analysis", Jan. 1994, Princeton University Press.

* cited by examiner

| Dataset | Related tweets | Tweets having two keywords |
|---|---|---|
| EQ41-$t_1$ | 227 | 224 |
| EQ41-$t_2$ | 379 | 375 |
| EQ41-$t_3$ | 306 | 302 |
| EQ623-$t_1$ | 92 | 92 |
| EQ623-$t_2$ | 124 | 122 |
| EQ623-$t_3$ | 84 | 84 |

Fig. 3

Algorithm 1: MinHash Incremental Clustering input : All tweets in $TC_2$ output: Clusters of the tweets $M$

1   $M \leftarrow \emptyset$ ;

2   Initialize the map $TM$ (*hashValue; clusterID*) ;

3   *hashValue* $\leftarrow 0$ ;

4   foreach $t \in TC_2$ do

5      *hashValue* $\leftarrow$ MinHash(t) ;

6      if *TM contains hashValue* then

7          Update $M$: assign $t$ to clusterID *TM:get(hashvalue)* ;

8      else

9          Update $M$: IncrementalClustering($t$) ;

10         Put *hashValue* and clusterID of t into $TM$ ;

11 return $M$

Fig. 4

Algorithm 2: Support Vector Machine Active Learning input : Tweet clusters $M$, iteration number $L$ output: Earthquake-related clusters $M_P$ and non-related $M_N$

1 Select at least two clusters from $M$. One is earthquake-related, the other is not. Add into training data set $Tr$ the rest of tweet clusters in $M$ as testing data $Te$ ;

2 for $i < L$ do

3      Model SVM($Tr$) Train SVM using $Tr$ ;

4      Classify $Te$ on SVM($Tr$) ;

5      Select cluster $q$ with minimum distance to decision boundary of SVM($Tr$);

6      Request label of q and add q into $Tr$ ;

7 $M_P$ , $M_N$ ← Classify $Te$ on SVM($Tr$);

8 Add positive/negative labelled data in $Tr$ into $M_P$ and $M_N$;

9 return $M_P$ , $M_N$

COLLECTING EVENT RELATED TWEETS

TECHNICAL FIELD

The present disclosure relates generally to computer systems, and more specifically, to a framework for collecting event related tweets from a messaging stream.

Major natural disaster events such as earthquakes, tsunamis and landslides often cause great loss and damage to individuals and local economy. Occurrence of such natural disaster events often generate a huge interest among different parties. For example, when an earthquake strikes, people outside of the affected region have a huge interest to learn about location of the epicenter, strength of the earthquake, as well as receive information/updates on casualties and damages to the infrastructures. These information are vital in order to estimate the overall damage caused by the earthquake, especially when the condition of their family members or friends located within the vicinity of the earthquake affected area cannot be immediately confirmed. In addition, information, such as status of the rescue and evacuation process, food supplies and medical assistance, is vital for the locals who are directly affected by the earthquake.

The event related information published by the traditional news media outlets are not at a fine-grained level and often, the information may not be current. The presence of various social media platforms such as Twitter help in overcoming the shortfall of the traditional news media outlets by providing real-time event relevant information. However, the real-time event relevant information provided by the social media platforms is of great volume and noisy. For example, when an average user queries for the event relevant information on Twitter, the most relevant event related information are often buried within the large volume of returned tweets.

Such issue has prompted researchers to develop methods for collecting event related data from social media platforms, such as Twitter, with a high measure of precision (i.e., accuracy or quality) and recall (i.e., completeness or quantity). The presently available methods for collecting data are mostly location-based or keyword-based methods. The location-based methods define the location boundary of the targeted place or conduct a search based on the information in the location field of user profiles. These methods, when used for collecting event related tweets, would miss out the tweets that are not tagged with locations, or the tweets posted by users from other places. On the other hand, data collected by the keyword-based methods is heavily depended on the comprehensiveness of the set of query keywords. Often, false positives are returned as a result of lack of precision and recall in the selected keywords. Furthermore, manually generating a set of high quality keywords is time-consuming and requires domain knowledge.

Therefore, it is desirable to provide an efficient method for collecting tweets which are highly relevant to an event of interest.

SUMMARY

A framework for collecting tweets relevant to an event of interest is described herein. In accordance with one aspect of the framework, an initial set of keywords is constructed from a reference source. Tweets are collected from a messaging stream using the initial set of keywords for a first time window. The collected tweets are filtered to generate a candidate keywords set. The selected tweets of the candidate keywords set are grouped into a plurality of clusters. The clusters are classified into event related and non-event related clusters. The initial set of keywords is updated to obtain a new set of keywords.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 3 shows a comparison table of earthquake related tweets and tweets having two matching keywords;

FIG. 4 shows an exemplary incremental MinHash clustering algorithm for clustering tweets; and FIG. 5 shows an exemplary Support Vector Machine (SVM) active learning algorithm for training a SVM classifier.

DETAILED DESCRIPTION

Figure 1:
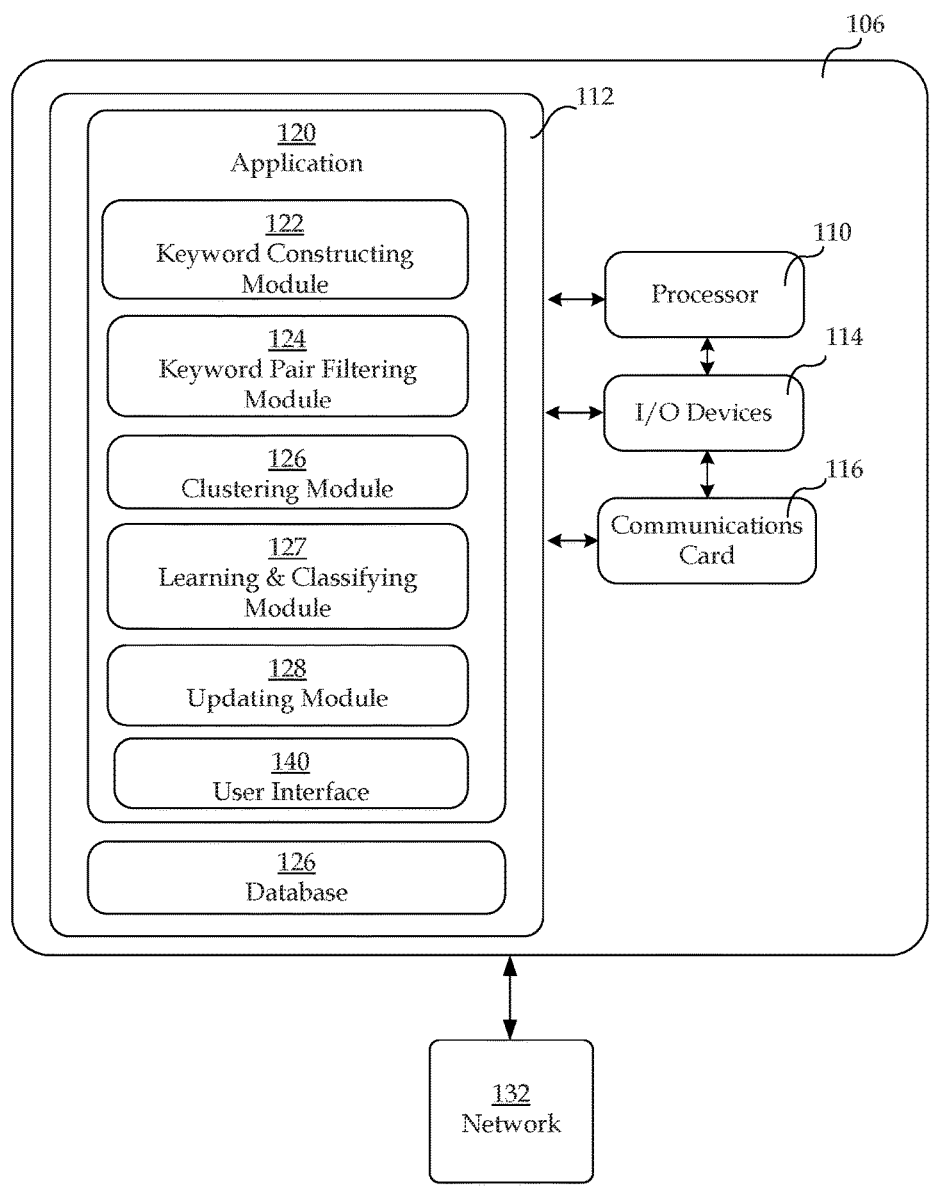
FIG. 1 is a block diagram illustrating an exemplary architecture.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for collecting tweets from a messaging stream which are highly relevant to an event of interest is described herein. An event of interest may be a natural disaster event, such as earthquakes, tsunamis, floods and landslides. For the purpose of illustration, the framework is discussed using an earthquake as the event of interest. However, it should be noted that the present framework may also be applied to other natural disaster events. A tweet, for example, is considered relevant to an earthquake if the tweet belongs to one of the following categories:

"Information Source" category which includes tweets indicating when and where the earthquake happened, the magnitude, epicentre, and affected region, and tweets indicating whether there are aftershocks and the reasons or possible reasons causing the event.

"Cautions and Advice" category which includes tweets warning the associated effects of an earthquake, such as a tsunami, volcano eruption, landslide or extreme weather. This category also includes tweets describing the evacuation or rescue preparation efforts.

"Casualty" category which includes tweets about the number of persons found, missing, injured and/or dead.

"Damage" category which includes tweets reporting the damage to the affected environments, for example, infrastructure including residential housing, schools, hospitals, highway condition, electricity, water supply and so on, and threatening destructions like nuclear leakage.

"Request, Donation and Assistance" category which includes tweets requesting for donations such as food, water, shelter, money, cloth, blood, medical supplies, and declarations of supports from other countries or individuals.

In accordance with one aspect, the present framework first assumes that an earthquake event is a known event and second, crawls (or collects) earthquake related tweets about the earthquake continuously in batches from a messaging stream, such as a Twitter stream, starting with an initial set of keywords. The initial set of keywords, for example, are constructed from a reference website and is supplied to the Twitter stream Application Programming Interface (API) for collecting a first batch/set of tweets for a first predefined time window. The predefined time window, for example, may be a few minutes, a few hours or a day, depending on the number of tweets collected. The collected tweets within the last time window are filtered and grouped into clusters for active learning. The earthquake-related tweets are then determined by using an active learning algorithm.

It should be appreciated that the framework described herein may be implemented as a method, a computer-controlled apparatus, a computer process, a computing system, or as an article of manufacture such as a computer-usable medium. These and various other features and advantages will be apparent from the following description.

FIG. 1 is a block diagram illustrating an exemplary architecture 100 in accordance with one aspect of the present framework. Generally, exemplary architecture 100 may include a computer system 106.

Computer system 106 is capable of responding to and executing computer-readable instructions in a defined manner. Computer system 106 may include a processor 110, input/output (I/O) devices 114 (e.g., touch screen, keypad, touch pad, display screen, speaker, etc.), a memory module 112, and a communications card or device 116 (e.g., modem and/or network adapter) for exchanging data with a network 132 (e.g., local area network or LAN, wide area network (WAN), Internet, etc.). It should be appreciated that the different components and sub-components of computer device 106 may be located or executed on different machines or systems. For example, a component may be executed on many computer systems connected via the network at the same time (i.e., cloud computing).

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks or cards, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor 110. As such, computer device 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 includes an application 120 and a database 126. The application 120 is any software framework that enables users to collect and process tweets from various social media platforms, such as Wikipedia and Twitter, via network 132. The application 120 may reference (or process) data stored in the database 126. In some implementations, the application 120 can be and/or include a web browser. In addition, the application 120 may include a user interface 140 that enables a user to access the application 120. In one embodiment, the user interface 140 includes a graphical user interface (GUI). A GUI may provide an efficient and user-friendly manner of presenting information or communicating with the computer system. For example, a GUI may include a task menu as well as one or more panels for displaying information.

The application 120 includes a keyword constructing module 122, a keyword pairing module 124, a clustering module 126, a learning module 127 and an updating module 128. The keyword constructing module 122 may be configured to collect event related documents from a reference website, such as Wikipedia, and construct a set of keywords from the collected event related documents. The keyword pairing module 124 may be configured to filter out non-related tweets containing the keywords. The clustering module 126 may be configured to group the tweets collected using the set of keywords into clusters. The learning module 127 may be configured to train a classifier for distinguishing event related and non-related tweets. The updating module 128 may be configured to update the list of keywords as the event evolves over the time. The features and functions of the various modules will be discussed in detail in the following description.

Database 126 is an organized collection of data, such as tables, queries, reports, views, and other objects. Database 126 may also include a database management system (DBMS), which is a system software for creating and managing databases 126. The DBMS provides users and programmers with a systematic way to create, retrieve, update and manage data. Database 126 may be based on a relational model, such as SAP HANA, Oracle Database, Microsoft SQL Server, MySQL, IBM DB2, IBM Informix, and so forth. Other types of database technology may also be used. In some implementations, database 126 stores keyword sets in physical data structures (e.g., tables) for user retrieval.

Computer system 106 may be communicatively coupled to one or more computer systems (not shown) via network 132. For example, computer system 106 may operate in a networked environment using logical connections to one or more remote computers (not shown). The remote computer may be another personal computer, a server, a router, a network PC, a peer device or other common network node, and typically includes many or all of the elements described above relative to computer system 106. Network 132 may be a local area network (LAN) or a wide area network (WAN).

Figure 2:
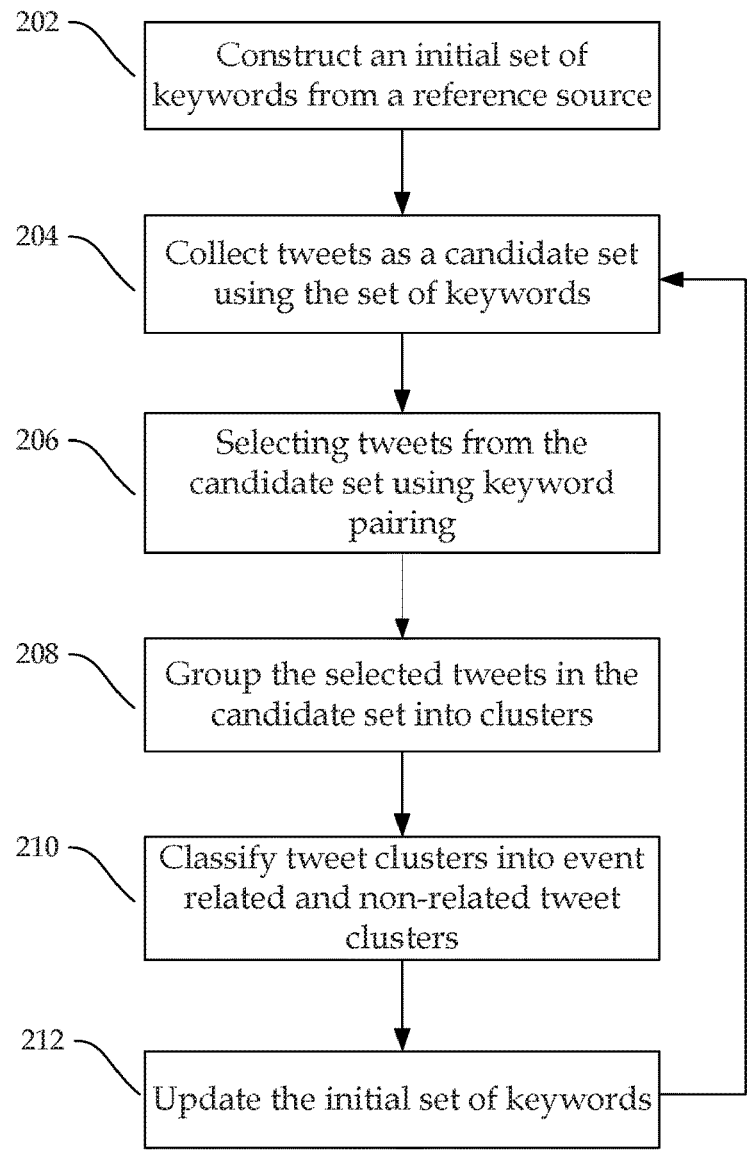
FIG. 2 shows an exemplary method for collecting event related tweets.

FIG. 2 shows an exemplary method 200 for collecting event related tweets. The method 200 may be performed automatically or semi-automatically by the system 100. It should be noted that in the following discussion, reference will be made, using like numerals, to the features described in FIG. 1.

At step 202, the keyword construction module 122 constructs an initial set of keywords. The initial set of keywords, for example, is a set of representative keywords which covers various aspects of an event of interest. The event of interest, for example, may be a natural disaster, such as an earthquake, a tsunami, landslide, flood or others. For purposes of illustration, the present framework is described in the context of an earthquake. However, it should be noted that the present framework may also be applied to events such as tsunamis, landslides, floods or other natural disaster events. The initial set of keywords are collected from a reference source or website based on topic taxonomy. For example, a set of candidate earthquake related keywords are collected from documents/entries having earthquake related titles/topics published on a reference source or website to construct the initial set of keywords. The reference source or website, for example, may be Wikipedia. In order to select the set of candidate earthquake related keywords from the collected earthquake related documents/entries, Part-of-Speech (POS) tagging is performed. The content of the documents/entries are tagged using the POS tagging. For example, each of the words in the content are tagged as a verb, noun or adjective. By assuming the earthquake related keywords are nouns, these keywords are selected from the content as the set of candidate earthquake-related keywords.

Keywords that are the most related to an earthquake are selected from the set of candidate earthquake related keywords to construct the initial set of keywords K. In one embodiment, Pointwise Mutual Information (PMI) is performed to identify keywords that make up the initial set of keywords. PMI measures the strength of association between the word "earthquake" and each of the nouns in the candidate set as follows:

$$PMI(e; w) = \log\frac{p(e, w)}{p(e)p(w)} = \log\frac{|D|*n(e, w)}{n(e)n(w)} \quad (1)$$

where
e denotes the word "earthquake";
w∈C denotes a candidate word w (or a noun) from the candidate set C;
D is the collection of earthquake-related documents/entries collected from Wikipedia;
|•| denotes the cardinality of the set;
n(e,w) is the number of documents/entries containing both the word "earthquake" and the candidate word w; and
n(e) and n(w) are the document frequencies of the word "earthquake" and the candidate word w, respectively.

A number N of the candidate words having top ranked PMIs are selected and added into the initial set of keywords K. The number N, for example, may be between 10 to 20. In one embodiment, the set K is expanded to have a broader coverage of keywords. The set K, for example, may be expanded using a lexical database, such as WordNet. For example, synonyms of each word w in the set K (w∈K) is acquired from WordNet and each of the acquired synonym is added into the set K.

At step 204, the initial set of keywords K is supplied to an Application Programming Interface (API) of a messaging stream, such as Twitter stream, for collecting a first batch/set of tweets in a first predefined time window. A predefined time window may be a few minutes or a few hours, depending on the number of tweets collected. Such batch mode processing enables the derivation of keywords from the tweets collected in the previous time window, and to expand keywords for tweet collection in the subsequent time windows.

A tweet collected in the first batch of tweets may contain at least one keyword which matches the keywords in set K. The set of collected tweets is denoted as candidate tweet set TC as follows:

$$TC = U_{w \in K} T(w) \quad (2)$$

where T(w) is the set of tweets matching keyword w.

At step 206, the keyword pair filtering module 124 removes non-related tweets from the candidate tweet set TC by selecting tweets having at least two words matching the initial set of keywords K. A non-related tweet includes one or more matching keywords which may not necessarily be related to an earthquake event. A non-related tweet may be included in the candidate set TC due to the broader coverage of keywords using, for example, WordNet. It is necessary to filter out the non-related tweets to reduce noise and computational cost which may occur in the subsequent processing steps.

FIG. 3 shows a comparison table 300 of earthquake related tweets and tweets having two matching keywords. The number of manually annotated earthquake related tweets 301 of two datasets 303 and 305 (EQ41 and EQ623) in different time windows ($t_1$, $t_2$ and $t_3$) are listed, and the corresponding number of event-related tweets matching two keywords 307 from the candidate tweet set TC are shown. As depicted in the datasets 303 and 305, more than 98% earthquake related tweets contain more than one keyword which matches the keywords keyword in set K. Based on this observation, the tweets in the candidate set TC are filtered using keyword pairs to remove non-related tweets. For example, a tweet is considered to be highly related to an earthquake if it contains at least two keywords of set K. The filtered candidate set is denoted by $TC_2$.

In one embodiment, due to the large size of the keyword set |K|, filtering of the tweet may not be implemented directly using Twitter stream API. The number of keyword pairs is represented by $$\frac{|K|*(|K|-1)}{2}.$$

As a result, the workload of Twitter API becomes unnecessarily heavy when |K| is large.

At step 208, the clustering module 126 groups the tweets in the filtered candidate set $TC_2$ into clusters. In one embodiment, similar tweets are grouped together into a cluster. Grouping the tweets into clusters advantageously ensures effective labelling in the subsequent active learning step. The clustering of the tweets, for example, are carried out using the MinHash algorithm which is shown to be effective in grouping near-duplicate tweets, or the tweets that are very similar to each other.

In one embodiment, the MinHash clustering algorithm is extended to be incremental and is applied to group the tweets in the filtered candidate set $TC_2$ into clusters at the end of each time window. FIG. 4 shows the incremental MinHash clustering algorithm 400 applied to the filtered candidate set $TC_2$ for clustering the tweets.

As described in the algorithm, for a new incoming tweet t, minimum hash values of the tweet t is calculated based on its uni-gram, bi-gram and tri-gram representations, respectively. The resultant hash value of the new incoming tweet t is the concatenation of the three minimum hash values. If the resultant hash value of the new incoming tweet t is the same as an existing tweet of a cluster, the new incoming tweet t is assigned to the same cluster. Otherwise, the new incoming tweet t is clustered based on its cosine similarity with existing clusters, as in typical incremental clustering. In one embodiment, angle-based similarity is computed based on the bag-of-words approach with term frequency and inverse document frequency (TF-IDF) weighting. If the similarity between the new incoming tweet t and any of the clusters is less than a threshold, the new incoming tweet t is assigned to a new cluster. Otherwise, the new incoming tweet t is assigned to an existing cluster with the highest similarity value. The angle-based similarity, for example, may include cosine similarity function. In one embodiment, the number of clusters cannot be determined until after performing the MinHash Incremental clustering algorithm and would depend on the distribution of collected tweets.

At step 210, the learning and classifying module 127 classifies the unlabelled clusters into earthquake related and non-earthquake related clusters. The non-earthquake related clusters may include false positive tweets. False positive tweets, for example, are tweets that contain at least two keywords that match the keyword set K, but are not earthquake related. In one embodiment, the unlabelled clusters are transformed into pseudo documents and classified using a machine learning classifier. In one embodiment, the machine learning classifier is a Support Vector Machine (SVM) classifier. Other types of machine learning classifiers may also be used.

In one embodiment, tweets in a cluster is considered as a document or instance. The tweets in each cluster are concatenating together to construct a pseudo document which represents the cluster. In one embodiment, each pseudo document is represented by a vector in a vector space model using the weighted bag-of-words approach. For example, each word in the pseudo document is identified as a feature using the TF-IDF weighting. The TF-IDF weighting statistically reflects how important a word is in the pseudo document. Each word in the document has a value which increases proportionally to the number of times (frequency) the word appears in the document, but is offset by the frequency of a word that is rare across the pseudo document by giving the rare word a higher weighting. The offset makes an adjustment for the fact that some words appear more frequently in general.

The SVM classifier is trained using a training set containing at least two clusters represented by pseudo documents. The at least two clusters are manually annotated/labelled. For example, the training data set includes at least one labelled cluster containing earthquake related tweets and at least one labelled cluster containing non-earthquake related tweets. The remaining clusters obtained in step 208 are added to the training data set as testing data. In one embodiment, one of the clusters from the classification result is selected and manually annotated for retraining the classifier to improve its classification accuracy.

FIG. 5 shows a SVM active learning algorithm 500 for training the SVM classifier. As shown, the trained SVM classifier is used to classify the remaining clusters of tweets (i.e., testing data). An uncertainty sampling method is adopted in the algorithm to select which cluster to query or to manually label during each iteration. According to this method, a data point which is the nearest to the decision boundary is selected. Such a data point is the most difficult or uncertain classified data point based on the current training data. By applying the iterative query and classifier retraining processes a few rounds, the final classifier labels the clusters to be earthquake related cluster set $M_P$ and non-earthquake related cluster set $M_N$.

At step 212, the updating module 128 utilizes the earthquake related cluster set $M_P$ to update the initial set of keywords K by adding event specific/representative keywords to the initial set of keywords K. In one embodiment, the original keywords of the initial set of keywords remain in the updated keywords set. Along with the development of an earthquake event, the main topics of the tweets may change, leading to the decay of old keywords and emergence of new keywords. For a word (i.e., candidate event representative keyword) that appears in an earthquake related tweet, the word is measured from the perspective of relevance, coverage and evolvement. That is, a representative keyword should be highly relevant to the current earthquake event, and has high coverage on Twitter stream, as well as the frequency of the keyword should increase along the development of the event (i.e., over the course of time). More accurate information (i.e., tweets) can be collected if the keyword is highly relevant to the current earthquake event. Similarly, more event related tweets can be collected if the keyword has a high coverage and frequency on Twitter stream.

In one embodiment, relative entropy, also known as the Kullback-Leibler divergence, is adopted to measure the relevance of a word. The Kullback-Leibler divergence measures the distance between two probability words. The distance of the probability of each word is calculated using the labeled cluster sets $M_P$ and $M_N$ as follows:

$$\text{Entropy}(w) = P(w, M_P) * \log\left(\frac{P(w, M_P)}{P(w, M_N)}\right) \quad (3)$$

The higher the Entropy (w) value, the more distinguishable the word w is in the cluster set $M_P$. Therefore, words with higher Entropy(w) values indicate high relevance of the words with respect to the earthquake event.

The coverage reflects the number of tweets containing the word. However, it is not possible to measure the coverage of a word in the next time window. Therefore, the coverage is estimated as the percentage of the number of tweets in the cluster set $M_P$ which a word appears in, over the number of tweets from the whole Twitter Stream T (collected through API) during current time window, as follows:

$$\text{Coverage}(w) = \frac{\text{\#tweets in } M_P \text{ containing } w}{\text{\#tweets in } T \text{ containing } w} \quad (4)$$

As shown in equation (4), the percentage of tweets having the word is collected based on the cluster set $M_P$ which belongs to the current keyword set K. In one embodiment, the words which lead to more tweets that are not covered by existing keywords are preferred and collected.

A high Coverage(w) value indicates that a large portion of the tweets are already covered in the current keyword set K. On the other hand, a small Coverage(w) value indicates that the word w could potentially capture more tweets because of the large number of tweets containing this word in the Twitter stream T. However, Coverage(w) value is preferably not too small. For example, if a word w rarely appears in earthquake related tweets, but often appears in non-earthquake related tweets, the word w should have a smaller Coverage(w) value. A smaller Coverage(w) value also means that there is not much relevance to the earthquake event. For this reason, the relevance and coverage measures are combined together to construct a rank score for each word w in the cluster set $M_P$, as follows:

$$\text{Rank}(w) = \text{Entropy}(w) * \exp^{\frac{1}{\text{Coverage}(w)}} \quad (5)$$

The top ranked words (i.e., candidate event representative keywords) obtained by equation (5) are selected and added to the keyword set K.

In one embodiment, a time series modelling, such as Autoregressive (AR) model, is adopted to model the evolvement or word trending. The time series modelling models a time varying random process. For example, the AR model models the trending of a keyword based on its frequencies in different time windows. The AR model specifies that the output variable x is depended on its own value in the past (i.e., previous time windows). That is, the keyword's future frequency is based on historical data. Specifically, the AR model predicts the variable value x in the next time window $x_{t+1}$ based on its value $x_t$ in the current time window, as follows:

$$x_{t+1} = \alpha x_t + \varepsilon_{t+1} \quad (6)$$

where
α is a parameter of the model; and
$\varepsilon_t$ is the Gaussian distribution white noise.

Using the AR model, the future value of a time series data is inferred using its historical data. In one embodiment, a word's frequency in the cluster set $M_P$ obtained at the current time window is used to predict its frequency in the next two time windows. If the frequency of the word demonstrates an increasing trend, the word is added into the keyword set K. The updated keyword set K is used to collect tweets from Twitter stream in the next time window. Steps 204 to 212 are iterated/repeated to continuously collect tweets from Twitter stream in the subsequent time windows.

The initial keywords set (i.e., keywords set K) and updated keywords set are stored in the database and available for user retrieval. In one embodiment, the keywords sets are stored in a table format and indexed for the ease of retrieval. For example, the keywords sets may be indexed by time windows as the event development is reflected by the sequence of the keywords. The user may also query a summary of the initial keyword set and updated keyword set from the database. The summary gives the user brief information of the event development without having to go through the extensive collected tweets.

The present framework as described results in numerous advantages. For example, the batch mode processing introduced by the present framework allows the keywords to be derived from the tweets collected in the previous/past time window, and expanded for tweet collection in the subsequent time windows. High recall is achievable because the keywords to be used in the subsequent time window is selected based on a ranking/scoring function which incorporates the relevance and coverage of an event of interest. Furthermore, the updating mechanism allows tracking of the main topics of the tweets relating to the event of interest over the time as the event evolves. This ensures the set of keywords are up to-date and comprehensive in order to achieve high precision and high recall.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for collecting event related tweets comprising:
    constructing an initial set of keywords from a reference source;
    collecting tweets from a messaging stream using the initial set of keywords for a first time window;
    filtering the collected tweets to generate a candidate keywords set;
    grouping the filtered tweets of the candidate keywords set into a plurality of clusters by:
        calculating respective minimum hash values of a new incoming tweet based on each of its uni-gram, bi-gram and tri-gram representations;
        generating a resultant hash value by concatenating the calculated three minimum hash values; and
        assigning the new incoming tweet to an existing cluster if the generated resultant hash value is the same as an existing tweet for such cluster, otherwise, clustering the new incoming tweet based on its cosine similarity with one of the existing clusters;
    classifying the clusters into event related and non-event related clusters; and
    updating the initial set of keywords to obtain a new set of keywords;
    wherein:
        the new incoming tweet is clustered based on its angled-similarity with existing clusters if the resultant hash value is different from the existing clusters;
        the angle-similarity is based on the bag-of-words approach with term frequency and inverse document frequency (TF-IDF) weighting;
        if the similarity between the new incoming tweet and any of the existing clusters is less than a threshold, the new incoming tweet is assigned to a new cluster; and
        if the similarity between the new incoming tweet and any of the existing clusters is more than a threshold, the new incoming tweet is assigned to an existing cluster having the closest similarity as the new incoming tweet.

2. The method of claim 1 further comprising storing the initial set of keywords and new set of keywords.

3. The method of claim 1 further comprising collecting tweets from the messaging stream using the new set of keywords for a subsequent time window.

4. The method of claim 1 wherein constructing the initial set of keywords from a reference source comprises:
    collecting documents having an event related topic from the reference source; and
    identifying the initial set of keywords using Part-of-Speech (POS) tagging.

5. The method of claim 4 wherein the initial set of keywords is selected from the identified initial set of keywords using Pointwise Mutual Information (PMI).

6. The method of claim 1 wherein the initial set of keywords is expanded using a lexical database.

7. The method of claim 1 wherein collecting tweets from a messaging stream using the initial set of keywords for a first time window comprises supplying the initial set of keywords to an Application Programming Interface (API) of the messaging stream for collecting the tweets.

8. The method of claim 1 wherein filtering the collected tweets comprises selecting tweets having at least two words matching any keywords in the initial set of keywords.

9. The method of claim 1 wherein grouping the filtered tweets of the candidate keywords set into a plurality of clusters comprises grouping similar tweets into a cluster, the similarity of the tweets being based on a similarity function.

10. The method of claim 1 wherein classifying the clusters into event related and non-event related clusters comprises training a machine learning classifier using at least two manually annotated clusters.

11. The method of claim 10 wherein the machine learning classifier is a Support Vector Machine (SVM) classifier.

12. The method of claim 1 wherein updating the initial set of keywords to obtain the new set of keywords comprises adding event representative keywords to the initial set of keywords, and wherein the event representative keywords are measured based on relevance, coverage and evolvement.

13. The method of claim 12 wherein the relevance and coverage measures are combined to construct a rank score for each candidate event representative keyword and top ranked candidate event representative keywords are selected and added to the new set of keywords.

14. The method of claim 13 wherein the evolvement of each candidate event representative keyword is measured using time series modeling.

15. A system for collecting event related tweets comprising:
 a non-transitory computer-readable medium for storing a database and computer-readable program code; and
 one or more processors in communication with the non-transitory computer-readable medium, the one or more processors being operative with the computer-readable program code to perform operations including:
  constructing an initial set of keywords from a reference source;
  collecting tweets from a messaging stream using the initial set of keywords for a first time window;
  filtering the collected tweets to generate a candidate keywords set;
  grouping the filtered tweets of the candidate keywords set into a plurality of clusters by:
   calculating respective minimum hash values of a new incoming tweet based on each of its uni-gram, bi-gram and tri-gram representations;
   generating a resultant hash value by concatenating the calculated three minimum hash values; and
   assigning the new incoming tweet to an existing cluster if the generated resultant hash value is the same as an existing tweet for such cluster, otherwise, clustering the new incoming tweet based on its cosine similarity with one of the existing clusters;
  classifying the clusters into event related and non-event related clusters; and
  updating the initial set of keywords to obtain a new set of keywords;
 wherein:
  the new incoming tweet is clustered based on its angled-similarity with existing clusters if the resultant hash value is different from the existing clusters;
  the angle-similarity is based on the bag-of-words approach with term frequency and inverse document frequency (TF-IDF) weighting;
  if the similarity between the new incoming tweet and any of the existing clusters is less than a threshold, the new incoming tweet is assigned to a new cluster; and
  if the similarity between the new incoming tweet and any of the existing clusters is more than a threshold, the new incoming tweet is assigned to an existing cluster having the closest similarity as the new incoming tweet.

16. A non-transitory computer-readable medium having stored thereon program code, the program code executable by a computer to perform steps comprising:
 constructing an initial set of keywords from a reference source;
 collecting tweets from a messaging stream using the initial set of keywords for a first time window;
 filtering the collected tweets to generate a candidate keywords set;
 grouping the filtered tweets of the candidate keywords set into a plurality of clusters by:
  calculating respective minimum hash values of a new incoming tweet based on each of its uni-gram, bi-gram and tri-gram representations;
  generating a resultant hash value by concatenating the calculated three minimum hash values; and
  assigning the new incoming tweet to an existing cluster if the generated resultant hash value is the same as an existing tweet for such cluster, otherwise, clustering the new incoming tweet based on its cosine similarity with one of the existing clusters;
 classifying the clusters into event related and non-event related clusters; and
 updating the initial set of keywords to obtain a new set of keywords;
wherein:
 the new incoming tweet is clustered based on its angled-similarity with existing clusters if the resultant hash value is different from the existing clusters;
 the angle-similarity is based on the bag-of-words approach with term frequency and inverse document frequency (TF-IDF) weighting;
 if the similarity between the new incoming tweet and any of the existing clusters is less than a threshold, the new incoming tweet is assigned to a new cluster; and
 if the similarity between the new incoming tweet and any of the existing clusters is more than a threshold, the new incoming tweet is assigned to an existing cluster having the closest similarity as the new incoming tweet.

* * * * *